(12) United States Patent
Ye et al.

(10) Patent No.: US 6,295,504 B1
(45) Date of Patent: Sep. 25, 2001

(54) MULTI-RESOLUTION GRAPH-BASED CLUSTERING

(75) Inventors: Shin-Ju Ye, Spring, TX (US); Phillipe J. Y. M. Rabiller, Lescar (FR)

(73) Assignees: Halliburton Energy Services, Inc., Houston, TX (US); Elf Exploration Production (FR)

(*) Notice: Subject to any disclaimer, the term of this patent is extended or adjusted under 35 U.S.C. 154(b) by 0 days.

(21) Appl. No.: 09/586,129

(22) Filed: Jun. 2, 2000

Related U.S. Application Data
(60) Provisional application No. 60/161,335, filed on Oct. 25, 1999.

(51) Int. Cl.[7] .................................................. G01V 3/38
(52) U.S. Cl. ............................................. 702/7; 702/11
(58) Field of Search .................................. 702/6, 78, 11, 702/12, 13; 367/72, 73; 324/338, 339

(56) References Cited

U.S. PATENT DOCUMENTS
4,646,240    2/1987   Serra et al. ........................... 364/422

FOREIGN PATENT DOCUMENTS
2215891    9/1989   (GB).

OTHER PUBLICATIONS
*Clustering Without A Metric*, Geoffrey Matthews et al., IEEE Transactions On Pattern Analysis And Machine Intelligence, vol. 13., No. 2, Feb. 1991, pp. 175–184.
*Robust Clustering With Applications In Computer Vision*, Jean–Michael Jolion et al., IEEE Transactions On Pattern Analysis And Machine Intelligence, vol. 13, No. 8, Aug. 1991, pp. 791–802.
*Threshold Validity For Mutual Neighborhood Clustering*, Stephen P. Smith, IEEE Transactions On Pattern Analysis And Machine Intelligence, vol. 15, No. 1, Jan. 1993, pp. 89–92.
*Fast Parzen Density Estimation Using Clustering–Based Brand And Bound*, Byeungwoo Jeon et al., IEEE Transactions On Pattern Analysis And Machine Intelligence, vol. 16, No. 9, Sep. 1994, pp. 950–954.
*Motion Estimation Via Clustering Matching*, Dane P. Kottke et al., IEEE Transactions On Pattern Analysis And Machine Intelligence, vol. 16, No. 11, Nov. 1994, pp. 1128–1132.

(List continued on next page.)

*Primary Examiner*—Donald E. McElheny, Jr.
(74) *Attorney, Agent, or Firm*—Conley, Rose & Tayon, P.C.

(57) ABSTRACT

An apparatus and method for obtaining facies of geological formations for identifying mineral deposits is disclosed. Logging instruments are moved in a bore hole to produce log measurements at successive levels of the bore hole. The set of measurements at each such level of the bore hole interval is associated with reference sample points within a multi-dimensional space. The multidimensional scatter of sample points thus obtained is analyzed to determine a set of characteristic modes. The sample points associated with characteristic modes are grouped to identify clusters. A facies is designated for each of the clusters and a graphic representation of the succession of facies as a function of the depth is thus obtained. To identify the clusters, a "neighboring index" of each log measurement point in the data set is calculated. Next, small natural groups of points are formed based on the use of the neighboring index to determine a K-Nearest-Neighbor (KNN) attraction for each point. Independently of the natural group formation, an optimal number of clusters is calculated based on a Kernel Representative Index (KRI) and based on a user-specified resolution. Lastly, based on the data calculated from the prior steps, final clusters are formed by merging the smaller clusters.

47 Claims, 7 Drawing Sheets

OTHER PUBLICATIONS

*A Least Biased Fuzzy Clustering Method*, Gerardo Beni, et al., IEEE Transactions On Pattern Analysis And Machine Intelligence, vol. 16, No. 9, Sep. 1994, pp. 954–960.

*Fast Nearest–Neighbor Search In Dissimilarity Spaces*, Andras Farago, et al., IEEE Transactions On Pattern Analysis And Machine Intelligence, vol. 15, No. 9, Sep. 1993, pp. 957–962.

*Application Of Kruskal Multidimensional Scaling (MDS) To Rock Type Identification From Well Logs*, Vaclav Matsas et al., The Log Analyst, Jan.–Feb. 1995, pp. 28–34.

*Automatic Determination Of Lithology From Well Logs*, Pierre Delfiner et al., SPE Formation Evaluation, Sep. 1997, pp. 303–310.

*Synergetic Log & Core Data Treatment: A Methodology To Improve Reservoir Description Through Cluster Analysis*, C. Descalzi, et al., SPE #17637, Society of Petroleum Engineers, Nov. 1988, pp. 1–13.

*The Contribution Of Logging Data To Sedimentology And Stratigraphy*, Oberto Serra et al., SPE 9270, Society of Petroleum Engineers of AIME, Sep. 1980, pp. 1–19.

*Borehole Acoustics And Logging And Reservoir Delineation Consortia*, Annual Report 1999, Earth Resources Laboratory, pp. 1–25.

*Faciolog—Automatic Electrofacies Determination*, M. Wolff et al., SPWLA Twenty–Third Annual Logging Symposium, Jul. 6–9, 1982, pp. 1–23.

*Facies Model, Second Edition*, Roger G. Walker, Geoscience Canada, Reprint Series 1, McMaster University, May, 1984, pp. 16 p.

*The Self–Organizing Map*, Teuvo Kohonen, Proceedings of the IEEE, vol. 78, No. 9, Sep. 1990, pp. 1464–1480.

MULTI-RESOLUTION GRAPH-BASED CLUSTERING

This application claims benefit to U.S. Provisional 60/161,335 filed Oct. 25, 1999.

BACKGROUND OF THE INVENTION

1. Field of the Invention

The present invention generally relates to the geological study of earth formations for the location and exploitation of mineral deposits using electrofacies analysis. More particularly, the present invention relates to a new system and method for identifying formations of mineral deposits using a user-friendly and reliable clustering technique that can extract natural clusters from sets of logged data points for improved electrofacies analysis of the formation.

2. Description of the Related Art

Mineral and hydrocarbon prospecting is based upon the geological study and observation of formations of the earth's crust. Correlations have long been established between geological phenomena and the formation of mineral and hydrocarbon deposits that are sufficiently dense to make their exploitation economically profitable.

The study of rock and soil facies encountered while prospecting for minerals takes on particular importance. As used herein, a facies is an assemblage of characteristics that distinguish a rock or stratified body from others. A facies results from the physical, chemical and biological conditions involved in the formation of a rock with respect to other rocks or soil. This set of characteristics provides information on the origin of the deposits, their distribution channels and the environment within which they were produced. For example, sedimentary deposits can be classified according to their location (continental, shoreline or marine), according to their origin (fluviatile, lacustrine, eolian) and according to the environment within which they occurred (estuaries, deltas, marshes, etc.). This information in turn makes it possible to detect, for example, zones in which the probability of hydrocarbon accumulation is high.

The set of characteristics used to define a facies depends on the situation. For example, a lithofacies may be defined by the rock's petrographic and petrophysical characteristics. These are the composition, texture and structure of the rock. Examples of mineral composition are silicate, carbonate, evaporite, and so on. A rock's texture is determined by its grain size, sorting, morphology, degree of compaction, and degree of cementation. The rock structure includes the thickness of beds, their alternation, presence of stones, lenses, fractures, degree of parallelism of laminations, etc. All of these parameters are related to the macroscopic appearance of the rock.

For extraction of hydrocarbons from geologic formations, the particularly desirable characteristics of the lithofacies are the porosity of the reservoir rocks and their permeability, as well as the fraction of the pore volume occupied by these hydrocarbons. These aid in estimating the nature, quantity, and producibility of the hydrocarbons contained in such strata.

There are various sources of information on formation lithofacies. Information may be gathered from subsurface observations such as, for example, by the study of core samples taken from rock formations during the drilling of a bore hole for an oil well. Such information can also be provided by drill cuttings sent up to the surface from the bottom of a well by means of a fluid (generally drilling mud) injected near the drilling tool. It is not normally cost-effective to identify facies using these methods. Information on geological formations traversed by a bore hole is more commonly gathered by a measurement sonde passing through the bore hole. The gathered information as a function of the sonde's position along the bore hole is then stored or "logged".

Many downhole measurement techniques have been used in the past, including passive measurements such as measuring the natural emission of gamma rays; and active measurements such as emitting some form of energy into the formation and measuring the response. Common active measurements include using acoustic waves, electromagnetic waves, electric currents, and nuclear particles. The sonde measurements are designed to reflect the distinguishing characteristics of the rock facies. Multiple logs and sondes may be used to gather the measurements, which are then correlated and standardized so as to furnish measurements at discrete levels separated by equal depth intervals. The measurement standardization allows the automation of data interpretation in order to obtain estimates of the porosity of the rocks encountered, the pore volume occupied by hydrocarbons, and the ease of flow of hydrocarbons out of the reservoirs in the case of petroleum prospecting. The set of measured formation characteristics values that distinguish the strata in a given bore hole is herein termed the electrofacies.

Interpretation studies have demonstrated a strong correlation between the electrofacies and lithofacies, thereby making it possible to identify with confidence the compositional characteristics of the rocks traversed by bore holes based on the sonde measurements. It has been established that the sets of log measurements (i.e. sample points) which correspond to a given lithofacies form a "cluster" in "data space". That is, when the measured characteristic values of a formation are graphed, the points generally fall into a continuous region which is distinguishable from the regions where points for other formations would fall.

Various systems and method that use the correlation or the observed clusters to identify lithofacies from electrofacies have been created. These systems take the logged measurements and convert them to a graph that furnishes, as a function of position along the bore hole, an image of a succession of facies. The graph typically also provides some indication of the measured formation characteristic values alongside the image. An example of one such system and its output is described in U.S. patent application No. 4646240, which is hereby incorporated herein by reference. However, before these systems can do the conversion, they must be tailored to the drilling region.

The most accurate existing systems and methods require a substantial amount of user participation to set up, and conversely, those existing systems which are highly automated tend to perform poorly. One proven approach uses a two-step methodology to correlate different measured characteristic values into generalized electrofacies charts for analysis. In the first step, the number of clusters is specified to an automatic clustering algorithm such as maximum likelihood algorithm, hierarchical clustering method, dynamic clustering or neural network. The number of clusters specified is large, creating clusters containing small numbers of points. A petrophysicist or geologist then manually assigns geological characteristics from the facies to each cluster and simultaneously merges similar small clusters into electrofacies.

Another approach for creation of electrofacies charts requires that the number of clusters specified to the automatic clustering algorithm be relatively small. In this approach, the geologist often has a problem assigning specific geological facies to the clusters, which tend to be much larger than the clusters in the previous approach. The geologist may also be required to "lump" together geological facies at a coarser level of distinction than might be appropriate. A large number of clusters require much work by the geologist to match clusters to geology; too few clusters cause the geologist problems in making meaningful linkages between clusters and geology.

The electrofacies analysis systems described above suffer from various limitations and drawbacks. The automatic clustering methods require the user to provide an initial number of clusters before processing. This is a limitation because the results are very sensitive to this parameter. Furthermore, unless the number is large, the identified clusters may have shapes that are not geologically meaningful. This prevents them from being directly used for facies analysis. On the other hand, manual merging of a large number of small clusters based on similar geological characteristics by hand makes this process slow and subjective. Furthermore, because electrofacies analysis occurs in N-dimensional space it is still difficult even for a trained individual with good visualization tools to identify clusters manually. Thus, it is desirable to develop a system and method that, in a relatively constant, reliable, and systematic manner, permits automatic clustering of logged data to extract information about the geological facies of the data.

SUMMARY OF THE INVENTION

Accordingly, there is disclosed herein a method for identifing formations of mineral deposits. In one embodiment of this method, logs are made over multiple levels within an interval along the bore hole in order to obtain a group of several measurements for each of these levels. With each such level of the bore hole interval is associated a sample point within a multidimensional space defined by the different logs. The sample point coordinates are a function of the logging values measured at this level. The sample points thus obtained will form a scatter diagram within this multidimensional space.

The sample points of this scatter diagram are used to determine a set of characteristic modes, each corresponding to a zone of maximum density in the distribution of these samples; each mode is regarded as a characteristic of a respective cluster and the surrounding samples of this cluster are related to it. A facies is designated for each of the modes thus characterized and a graphic representation is produced as a function of the depth of the succession of facies thus obtained. The characteristic modes of each cluster are made up of sample points coming from the measurements themselves.

To identify the clusters, a neighboring index of each log measurement point in the data set is calculated. Next, small natural groups of points (called attraction sets) are formed based on the use of the neighboring index to determine the K-Nearest-Neighbor (KNN) attraction for each point. Independently of the natural group formation, the optimal number of clusters is calculated based on the Kernel Representative Index (KRI) and a user-specified resolution. Lastly, based on the data calculated from the prior steps, final clusters are formed by merging the attraction sets.

Experimentation confirms that the above method allows an accurate determination of the geological facies derived from the logging measurements obtained within an interval of geological formations traversed by a sonde traveling in a bore hole.

BRIEF DESCRIPTION OF THE DRAWINGS

For a more detailed description of the preferred embodiments of the present invention, reference will now be made to the accompanying drawings, wherein.

Figure 1:
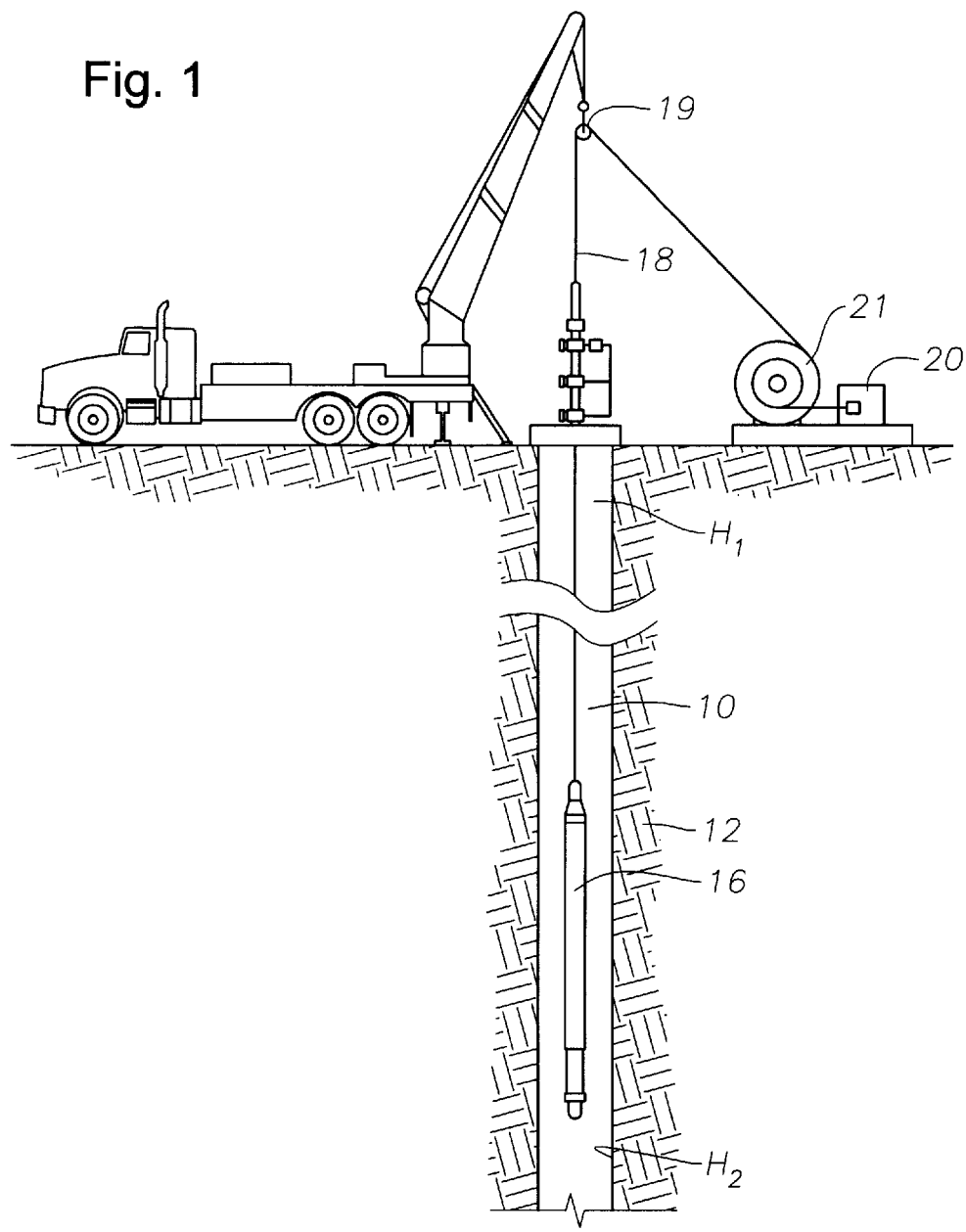
FIG. 1 illustrates logging equipment in operation in a bore hole.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENT

FIG. 1 shows logging equipment in a bore hole 10 going through earth formations 12. The equipment includes a sonde 16 is suspended in the bore hole 10 at the end of a cable 18. Cable 18 connects sonde 16 both mechanically and electrically, by means of a pulley 19 on the surface, to a control installation 20 equipped with a winch 21 around which the cable 18 is wound. The control installation includes recording and processing equipment known in the art that make it possible to produce graphic representations called logs of the measurements obtained by the sonde 16 according to the depth of the sonde in the bore hole or well 10.

The bore hole 10 passes through a series of earth formations (not specifically shown) that is typically composed of a series of zones or "beds". The zones are identified by the rock facies they contain, e.g. clay, limestone, etc. From the geological viewpoint, each of these successive zones is characterized by a relative homogeneity that is revealed by a set of characteristic data values (facies). These values vary from one zone to another, but have a relatively limited range of variation within a given zone. These data, which depend in particular on the mineralogical composition, the texture and the structure of the rocks making up these zones, identify respective facies.

It is possible to establish a correspondence between, on the one hand, different facies characterized by mineralogical factors, texture and structure and, on the other hand, electrofacies which can be obtained directly from a suitable quantitative analysis of a set of logs measured by the sonde as it traverses the bore hole. The possibility of establishing such a correspondence between electrofacies and facies is capable of providing a valuable aid in the geological knowledge of a zone of the earth's crust within a given region, such knowledge being useful in completing the information usually available to geologists and, in certain cases, helping them in the interpretation of the facies encountered to obtain information on the history of the formations and for determining the concentrations of mineral deposits.

An approximate image of the facies may be produced by first obtaining a number of logs over a bore hole interval $H_1$–$H_2$. The measured values are discretized and correlated in depth so as to have, for each level of the interval considered, a set of distinct log values. In one embodiment, the measurements are discretized into levels at 15 cm intervals. The set of log values thus obtained is analyzed to determine groups of consecutive levels that have log values within a given range. The upper and lower values of the range are based on the potential variations that may be caused by, e.g. bore hole conditions such as roughness or caving of the bore hole walls. Those consecutive levels having log values in the given range may be considered to share a "true" physical characteristic value that is substantially constant over those levels. In this manner, those zones having relatively constant values may be portrayed as facies having the indicated measurement values.

Figure 2:
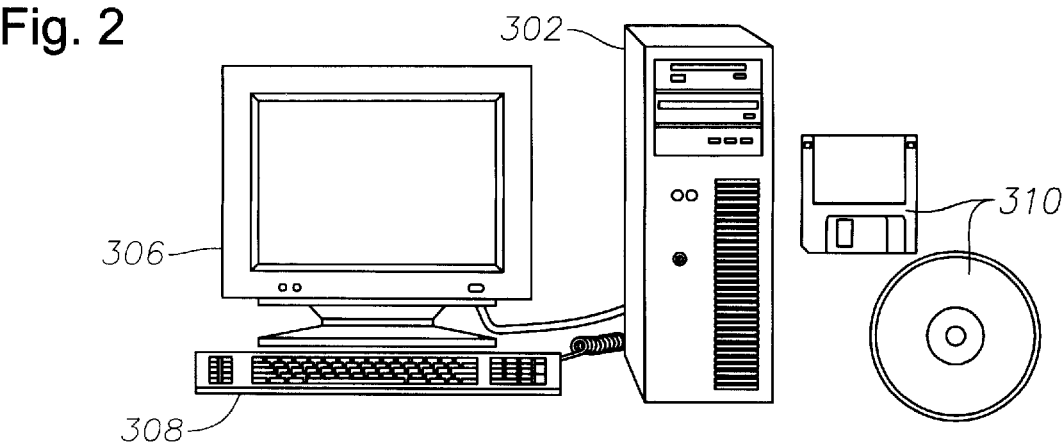
FIG. 2 illustrates a computer system used to process the logged data and determine mineral compositions of the earth formation.

To generate an image of the facies using the logged data points, processing of the logged data measured by the sonde as it traverses the formation may be handled at the well site by a computer system such as that shown in FIG. 2. The computer system consists of a keyboard 308 and a monitor 306 to permit user interaction with the computer tower 302 containing the CPU and peripheral hardware. Logs gathered at the well site may be graphically displayed on the monitor 306 and clustering (described below) may be performed to determine the petrophysical characteristics of the formation.

Alternatively in a second embodiment, because of cost, space, power, and transportation restrictions, one may prefer storage of the logged data gathered by the sonde in a storage medium such as a 3.5" diskette, tape or recordable compact disc 310. Processing of the data for determination of formation characteristics may then occur at the office or laboratory using more powerful CPUs at a substantially lower cost than at the well site.

Figure 3:
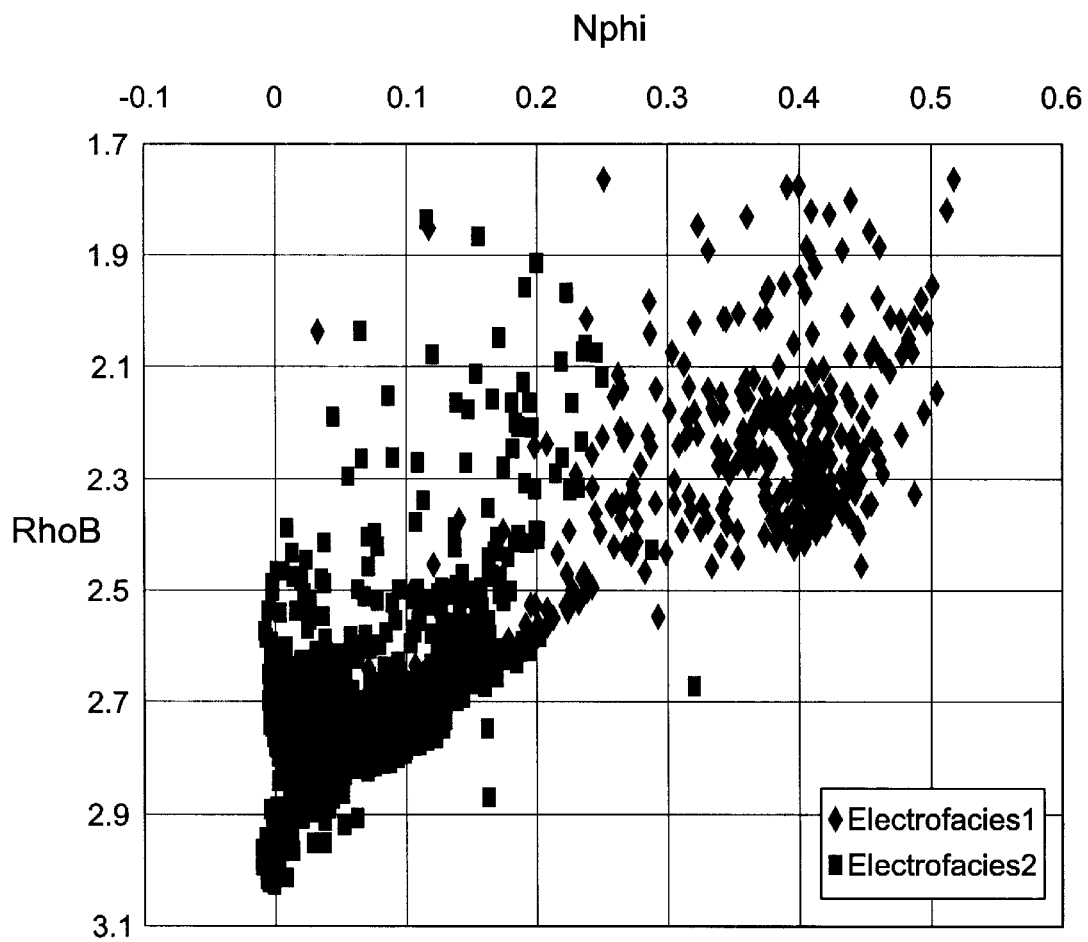
FIG. 3 illustrates the scattering of points representative of the values of two characteristic parameters of the formations measured within a given depth interval.

As shown in FIG. 3, if one analyzes a scattering of points representative of the logs carried out on a succession of levels in a bore hole interval, it is noted that the distribution density of these points in the scatter varies. This figure is the result of Multi-Resolution Graph-based Clustering (MRGC) using four logs (Nphi, RhoB, GR and DT), although only the two log measurements RhoB and Nphi are shown in the two dimensional graph. RhoB corresponds to a density measurement log and Nphi is a porosity measurement log measured by a Compensated Neutron Log (CNL) tool. Examples of other log measurement properties include natural gamma radiation measurements (GR), temperature measurement (HRT), inverse of square root of resistivity measurement near the wall of the well in the "invaded" zone (HRXO), acoustic wave transit time measurement (DT), measurement of resistivity of formation far from well or bore hole (RT), and measurement of resistivity near bore hole wall (RXO). These measurements may be made by logging tools such as resistivity tools, induction tools, nuclear magnetic resonance tools, thermal neutron decay tools, and gamma radiation tools, among others. FIG. 3 demonstrates in two dimensions the results of the automatic clustering technique described below. Although only 2 dimensions are shown, the technique is generally applied to N-dimensions for N log measurement properties (4-dimensions were used to obtain the clusters shown in FIG. 3).

Once a set of measurement points has been obtained, it is desired to partition the points. Initially, this partitioning is achieved by gathering the points into clusters using a cluster identification algorithm. Many such algorithms exist, and they almost universally require that the data be normalized.

There are several ways to normalize the data. One classical method, frequently used, is to limit the data in an unit hypercube $[0,1]^d$, d being the number of features, which corresponds to the number of dimensions. In each dimension, that dimension's minimal value is subtracted from the data, and the difference is divided by the total range of the data in that dimension. In another method, the average value of each feature is subtracted from the data, and the difference divided by the standard deviation. The normalization changes the distance between data points and affect the natural separation of data points, but it is necessary to prevent an improper choice of scale in one dimension from dominating the measurements in other dimensions.

The clustering algorithms can be divided into parametric algorithms, and non-parametric algorithms. Parametric algorithms are generally regarded as being less desirable than non-parametric algorithms because parametric algorithms are based on some model of the data, whereas non-parametric algorithms make no assumptions about the data pattern. One consequent advantage of non-parametric algorithms is that they are capable of recognizing clusters of varied shapes.

One example of a non-parametric approach is to divide the observations space (e.g. the graph of FIG. 3) into regular hypercubes of a fixed size and estimating the probability density function (PDF) of the data based on the number of measurement points in each hypercube. One drawback of this approach is that the number of hypercubes increases exponentially as the number of data dimensions. Furthermore, this approach encounters critical difficulties when the data includes clusters that are closely spaced and/or clusters of very different densities or sizes.

Another example of a non-parametric approach is the K-Nearest-Neighbor (KNN) approach. Rather than estimating the PDF by determining how many points are in a given data volume (e.g. a hypercube), the PDF is estimated by measuring the data volume occupied by a given number of points. The K-Nearest-Neighbor approach estimates the PDF around a point by determining the radius from the point to its Kth nearest neighbor.

Another example of a non-parametric approach is described by C. T. Zahn in *Graph theoretical methods for detecting and describing Gestalt Clusters*, IEEE Trans. On Computers, v. C-20, n. 1, pp. 68–86, 1971, incorporated herein by reference. This approach relies on graph theory. A connected graph is constructed by linking the data points $x_i$ by arcs according to their proximity relationship.

In a graph representation of a data set, each observation $x_i$ is represented by a node, and an arc is established between two distinct nodes if they are linked by a relationship defined in the data set S. The graph is denoted by G=(S, A), where A is the set of arcs. Various graph structures have been used for clustering. Four particular structures are the Minimum Spanning Tree (MST), Relative Neighborhood Graph (RNG), Gabriel Graph (GG), and Delaunay Triangulation Graph (DTG). The MST is the graph that connects every node together with the shortest overall arc length. The RNG, GG, and DTG are graphs with nodes coupled based on increasingly relaxed distance requirements. For a given set of measurement points, these graphs are related in the following manner:

$$MST \subseteq RNG \subseteq GG \subseteq DTG \qquad (Eqn 1)$$

The inclusion of $G \subseteq G'$ means that, for the same node set S, the set of arcs of G is contained in the set of arcs of G'. The connectivity of MST implies the connectivity of the other 3 structures, so that these graph-based methods begin with a single cluster that is to be divided.

Typically, heuristic rules are then applied to remove the "inconsistent" arcs that bridge inherent separations among potential clusters. The elimination of these arcs breaks the graph into several connected sub-graphs, called connected components. Each connected component gathers a group of points that are recognized as a cluster. The difficulty with this approach lies in the determination of the heuristic rules. Generally, these rules are based on the comparison of valuation of arcs with a homogeneity criterion for detecting arcs with uncommon valuation (the "inconsistent" arcs). However, no such rules have been successfully established for more than three dimensions. Furthermore, the resulting clusters are often unstable due to the irregularity of data distribution (i.e. the identified clusters are highly sensitive to small disturbances in the data).

A fourth non-parametric approach is described by the authors of the following references:

C. Gan et al *Classification non supervisée par détection des zones frontiéres application en reconnaissances desformes et segmentation,* 13iéme Colloque GRETSI, Juan-les-pins, Tome 2, pp. 1105–1108, 1991, and C. Gan, *Une approche de classification non supervisée basée sur la notion des k plus proches voisins,* French Ph.D. Thesis, University of Technology of Compiégne, 1994. In this approach, the KNN approach is combined with the graph theory approach to devise a "Boundary Index" that allows detection of data clusters from data sets of any dimension and of very complex shapes and configurations. Like KNN, Gan requires a single parameter: the number of neighbors K. That is, given a value for K, the number of clusters is automatically determined. Unlike KNN, Gan's Boundary Index is sensitive to the "change" of the local PDF rather than to the PDF itself. The KNN estimates the local PDF, whereas the Boundary Index (BI) indicates whether a point is relatively close to a mode of the PDF (i.e. a local maximum density zone, or the center of a cluster) or relatively close to a valley of the PDF (i.e. a local minimum density zone, or the border of a cluster). Gan's Boundary Index is now developed here in detail in the context of measurement point clustering.

Let measurement point x be an element of the set of measurement points $S=\{x_1, x_2, \ldots X_N\}$ and let measurement point y be measurement point x's nth Nearest Neighbor (NN) in the set of measurement points S, $n \leq K$. The "limited rank" of measurement point x with respect to its nth NN, y, is defined to be:

$$\sigma'_n(x) = m \quad \text{if } x \text{ is the } m^{th} \text{ NN of } y, m \leq K \qquad (Eqn 2)$$
$$\phantom{\sigma'_n(x) =} b \quad \text{if } x \text{ is the } m^{th} \text{ NN of } y, m > K,$$

where b is set so that $K+ \leq b \leq N-1$. In other words, the limited rank $\sigma_n'(x)$ is the rank of x relative to y up to K, and then it is b thereafter. In practice, b is set equal to b=K+1, thereby providing all points outside the neighborhood of interest an equal ranking.

The limited rank $\sigma_n'(x)$ is defined above for n=1, 2, ..., K, i.e. for x's K nearest neighbors. The sum of the limited ranks for each point x is expressed as:

$$s'(x) = \sum_{n=1}^{K} \sigma'_n(x). \qquad (Eqn 3)$$

The smallest sum of the limited ranks is expressed:

$$s'_{min} = \underset{i=1,N}{Min} \{s'(x_i)\}, \qquad (Eqn 4)$$

where N is the number of measurement points in the data set S. The largest sum of the limited ranks is similarly expressed:

$$s'_{max} = \underset{i=1,N}{Max} \{s'(x_i)\}. \qquad (Eqn 5)$$

Using the largest and smallest sums of the limited ranks, the limited rank sums can be normalized to a range of 0 to 1:

$$I'(x) = \frac{s'(x) - s'_{min}}{s'_{max} - s'_{min}}. \qquad (Eqn 6)$$

This is the Boundary Index function I'(x). Because a point near a mode of the PDF is more likely to be the nearest neighbor of nearby points than a point near a valley of the PDF, a boundary index value near zero indicates that measurement point x is near a mode of the PDF, whereas a value near one indicates that measurement point x is near a valley of the PDF.

After determining the boundary indices, Gan applies a relaxation process to the boundary indices to remove the local irregularities. Gan then separates the cluster kernel points from the boundary points by a simple thresholding of the boundary index values. In using this approach, the optimal value of K is determined by systematically repeating the process for various values of K and observing the resulting numbers of clusters. A "stable zone" may appear in which a range of consecutive K values results in a consistent number of clusters. Any of these K values may be considered optimal.

Advantages of Gan's approach include the identifiability of clusters having varied shapes, densities and volumes, even when they are small. Disadvantages include cluster sensitivity to K. As expected, increasing K generally decreases the number of clusters due to a stronger smoothing effect. However, when the clusters are not well-separated, the "stable zone" disappears and it becomes difficult to identify a suitable value for K. Further, the organization of the clusters is very sensitive to small changes in K. Finally, for very unbalanced cluster sizes, this approach fails to identify obvious clusters. For example, experiments indicate that for a log data set containing 2500 points with more than a third of these data points concentrated in a very small space forming a very compact cluster, and having the remaining points dispersed in a very large zone forming many clusters of great volumes, Gan's approach does not identify the obvious compact cluster as one cluster. Rather, Gan's approach generates several clusters in the small compact zone and a few clusters in the large zone. The disadvantages and drawbacks of Gan's approach may be overcome by the method of Multi-Resolution Graph-based Clustering (MRGC) shown in FIG. 4.

Prior to clustering, the MRGC method requires the log measurements to be normalized. As with all clustering methods using the concept of "distance", the MRGC is sensitive to scale changes. It is therefore desired to first normalize the data so as to balance the weights of each measured feature (a feature represents one dimension of data point). Hereafter, it is assumed that the data has been normalized in some fashion.

The first step in the MRGC method, block 510, determines a "Neighboring Index" value for each measurement point. The neighboring index values are then used in block 515 to automatically form small basic data groups by use of a multidimensional KNN point-to-point attraction algorithm. Independently of block 515, the neighboring index values are used in block 520 to determine a "Kernel Representative Index" (KRI) for each measurement point. The points are then ordered according to their KRI, and one or more optimal numbers of clusters (corresponding to different resolutions) is suggested to the user. The user selects a resolution, and in block 530, the final clusters are obtained by use of a multidimensional merging process that joins the basic data groups in the order of their linking strength at their joint boundary, until the desired number of clusters is achieved.

Figure 4:
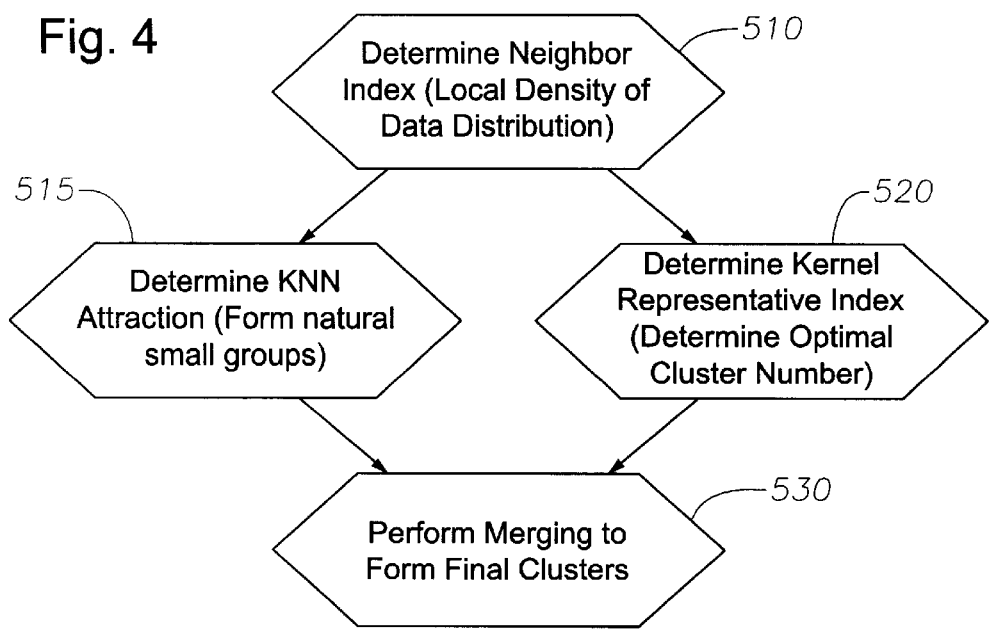
FIG. 4 is a flow diagram showing the steps for Multi-Resolution Graph Based automatic clustering.

Once the clusters have been obtained, they can be provided to a geologist who identifies the facies that they represent. Discussed further below are methods for using the clusters to provide identification of new measurement points taken elsewhere. First, however, each of the blocks in FIG. 4 is described in greater detail.

In block 510, the MRGC method calculates a modified boundary index using an exponential function and an unlimited window size, which is always equal to N-1 (N is the total number of data points). The new index is called "Neighboring Index" (NI), and it is based on the weighted rank of measurement point x relative to all the other measurement points y:

$$\sigma_n(x) = \exp(-m/\alpha),\qquad \text{(Eqn 7)}$$

where x is the $m^{th}$ NN of y, with y being the nth NN to x. The K parameter in the boundary index function is effectively replaced by a constant $\alpha$ that is greater than zero. It is noted that $\alpha$ is insensitive to the size of the data set and may be set once for all log data sets. In practice, $\alpha$ has been successfully set to 10, but a range of successful values is expected. The weighted rank $\sigma_n(x)$ is defined relative to all the other points, so n ranges from 1 to N-1.

Unlike the limited rank function $\sigma_n'$ which is an increasing function, the weighted rank function $\sigma_n$ is a strictly decreasing function varying from 1 to 0, i.e., (1, 0). With respect to each of its neighbor, x has a rank $\sigma_n(x)$, n=1, 2, . . . , N-1. The sum of the weighted ranks for a given measurement point x is:

$$s(x) = \sum_{n=1}^{N-1} \sigma_n(x).\qquad \text{(Eqn 8)}$$

The smallest and largest sums are expressed $$s_{\min} = \operatorname*{Min}_{i=1,N}\{s(x_i)\}, \text{ and} \qquad \text{(Eqn 9)}$$

$$s_{\max} = \operatorname*{Max}_{i=1,N}\{s(x_i)\} \qquad \text{(Eqn 10)}$$

The Neighboring Index function I is defined to be:

$$I(x) = \frac{s(x) - s_{\min}}{s_{\max} - s_{\min}}.\qquad \text{(Eqn 11)}$$

The value of I varies between 0 and 1. Unlike the boundary index function, the higher the value of the neighboring index function I, the closer the point to a mode of the PDF. The neighboring index function replaces K with a smoothing parameter $\alpha$, but advantageously, the neighboring index function is less sensitive to changes in $\alpha$.

Figure 5:
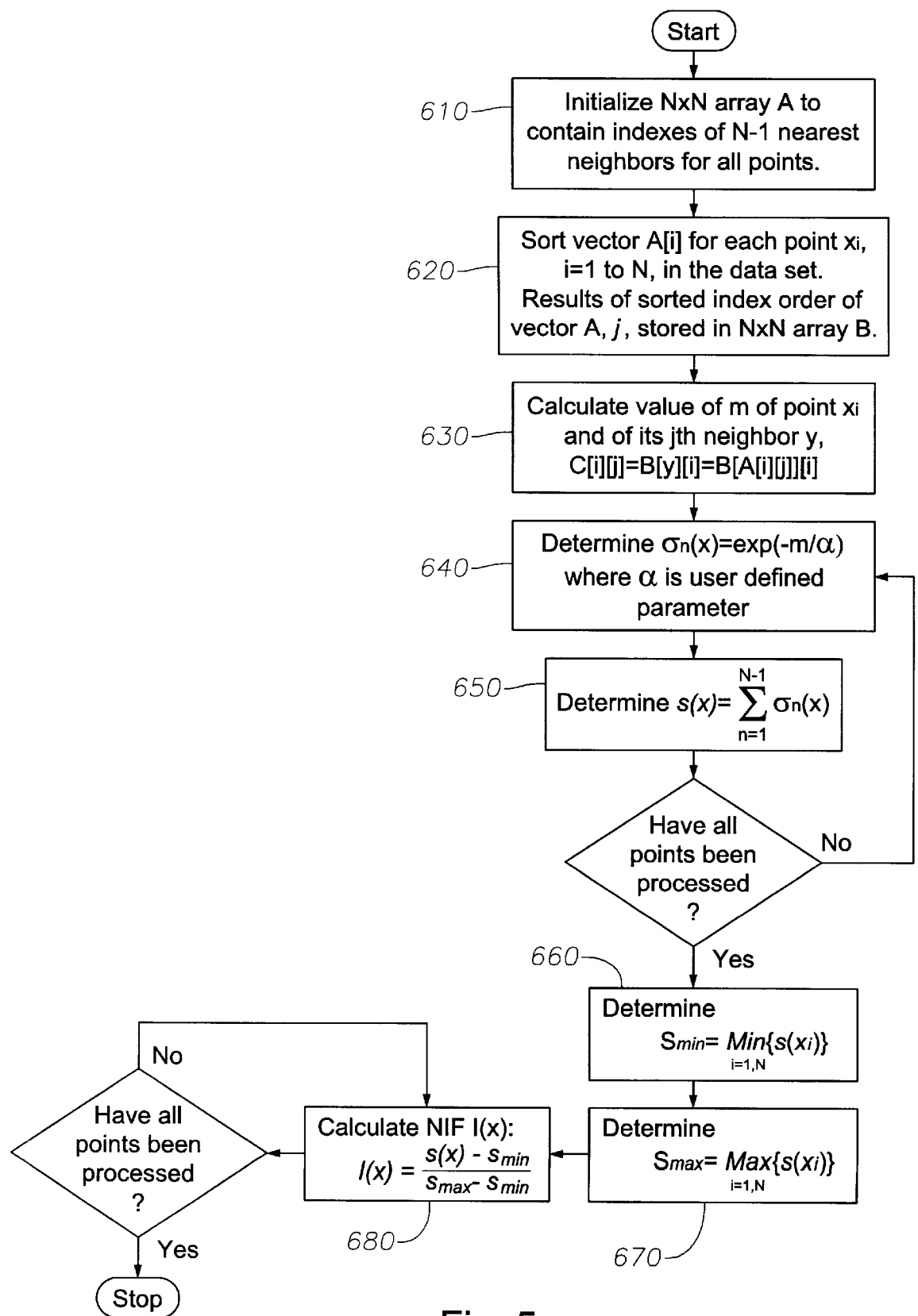
FIG. 5 is a flow diagram showing the steps to determine Neighboring Index Function.

One method for calculating the Neighboring Index function is now described with reference to FIG. 5. First, each measurement point is assigned an index i from 1 to N. In step 610, a nearest neighbor array A is determined in which A[i][j] is the index of the jth nearest neighbor of measurement point $x_i$. For example with 6 measurement points, A could be:

$$A = \begin{array}{c} \\ i=1 \\ i=2 \\ i=3 \\ i=4 \\ i=5 \\ i=6 \end{array} \begin{array}{|cccccc|} \hline 5 & 2 & 6 & 4 & 3 & 1 \\ 4 & 6 & 3 & 1 & 5 & 2 \\ 6 & 1 & 5 & 2 & 4 & 3 \\ 1 & 3 & 2 & 5 & 6 & 4 \\ 6 & 2 & 4 & 3 & 1 & 5 \\ 2 & 3 & 1 & 4 & 5 & 6 \\ \hline \end{array} \quad \begin{array}{c} j=1 \text{ to } 6 \\ \\ \\ \\ \\ \\ \\ \end{array} \qquad \text{(Eqn 12)}$$

In this example, $x_2$'s nearest neighbor is $x_4$, and $x_4$'s nearest neighbor is $x_1$. For convenience, $x_i$ is considered to be the Nth nearest neighbor of itself. The determination of this array requires on the order of $N^2/2$ operations due to the need to calculate the distance from each point to every other point. Once it is determined, a sorting algorithm can be used to identify the rank array C in which C[i][j] is the rank of measurement point $x_i$ relative to its jth nearest neighbor.

In step 620, a companion array B initialized as follows:

$$B = \begin{array}{c} \\ i=1 \\ i=2 \\ i=3 \\ i=4 \\ i=5 \\ i=6 \end{array} \begin{array}{|cccccc|} \hline 1 & 2 & 3 & 4 & 5 & 6 \\ 1 & 2 & 3 & 4 & 5 & 6 \\ 1 & 2 & 3 & 4 & 5 & 6 \\ 1 & 2 & 3 & 4 & 5 & 6 \\ 1 & 2 & 3 & 4 & 5 & 6 \\ 1 & 2 & 3 & 4 & 5 & 6 \\ \hline \end{array} \quad \begin{array}{c} j=1 \text{ to } 6 \\ \\ \\ \\ \\ \\ \\ \end{array} \qquad \text{(Eqn 13)}$$

is used to track the initial position of indices in nearest neighbor array A. The nearest neighbor array A is sorted a row at a time with B as a companion array. As values are rearranged in A, the companion array B is rearranged in the same way. After the contents of the rows in A are sorted in the above example, the companion array B is:

$$B = \begin{array}{c} \\ i=1 \\ i=2 \\ i=3 \\ i=4 \\ i=5 \\ i=6 \end{array} \overset{j=1 \text{ to } 6}{\begin{bmatrix} 6 & 2 & 5 & 4 & 1 & 3 \\ 4 & 6 & 3 & 1 & 5 & 2 \\ 2 & 4 & 6 & 5 & 3 & 1 \\ 1 & 3 & 2 & 6 & 4 & 5 \\ 5 & 2 & 4 & 3 & 6 & 1 \\ 3 & 1 & 2 & 4 & 5 & 6 \end{bmatrix}} \quad \text{(Eqn 14)}$$

Since B[1][3]=5, this indicates that $x_3$ is the $5^{th}$ nearest neighbor of $x_1$. It is noted that it is desired to preserve the original nearest neighbor array A, so the sorting operation is performed on a temporary copy of A and the original is left undisturbed for future use.

In step 630, the array C is filled so that C[i][j] is the rank of measurement point $x_i$ relative to its jth nearest neighbor. Since the index of the jth nearest neighbor of $x_i$ is A[i][j], and B[k][i] gives the rank of i relative to $X_k$, the following relationship can be used to find C:

$$C[i][j]=B[A[i][j]][i] \quad \text{(Eqn15)}$$

For the above example, the rank matrix C is:

$$C = \begin{array}{c} \\ i=1 \\ i=2 \\ i=3 \\ i=4 \\ i=5 \\ i=6 \end{array} \overset{j=1 \text{ to } 6}{\begin{bmatrix} 5 & 4 & 3 & 1 & 2 & 6 \\ 3 & 1 & 4 & 2 & 2 & 6 \\ 2 & 5 & 4 & 3 & 2 & 6 \\ 4 & 5 & 1 & 3 & 4 & 6 \\ 5 & 5 & 4 & 3 & 1 & 6 \\ 2 & 1 & 3 & 5 & 1 & 6 \end{bmatrix}} \quad \text{(Eqn 16)}$$

Having determined the rank matrix C, it can be used in step 640 to easily calculate the weighted ranks $\omega_n(x)$ of Eqn7, which are in turn used in step 650 to calculate the summations of weighted ranks s(x) of Eqn8. The minimum and maximum summations are determined in steps 660 and 670, and then in step 680 the Neighboring Index values of Eqn11 are calculated for each measurement point.

Returning momentarily to FIG. 4, once the neighboring index values are calculated, they are then used in block 515 to automatically form small basic data groups by use of a multidimensional KNN point-to-point attraction algorithm. These attraction sets will be used in the mode merging step 530 for forming final clusters.

The basic idea of the multidimensional KNN point-to-point attraction method is to attempt to associate every point x in the set of measurement points with an adherence point y that maximizes the attraction function, $Attr_x(y)$. The choice of the point y is based on the concept of "path of the highest gradient". A general attraction function is:

$$Attr_x(y)=I(y)V_x(y)-I(x) \quad \text{(Eqn17)}$$

The Neighboring Index values of points x and y are represented by I(x) and I(y) respectively. The adherence function $V_x(y)$ can be any function. A useful form of the adherence function could be the exponential function:

$$V_x(y)=\exp(-m/\beta), \text{ where y is the mth NN of x and } \beta>0 \quad \text{(Eqn18)}$$

In the preferred embodiment, the MRGC uses $V_x(y)=1$ if y is one of the $K_2$ nearest neighbor points of point x, and 0 otherwise. Each point x is "directed" to the nearest neighbor y that maximizes the attraction function with a value greater than zero. If none of the nearest neighbor points of x has an attraction value greater than zero, then x is not adhered to any other points.

Figure 6:
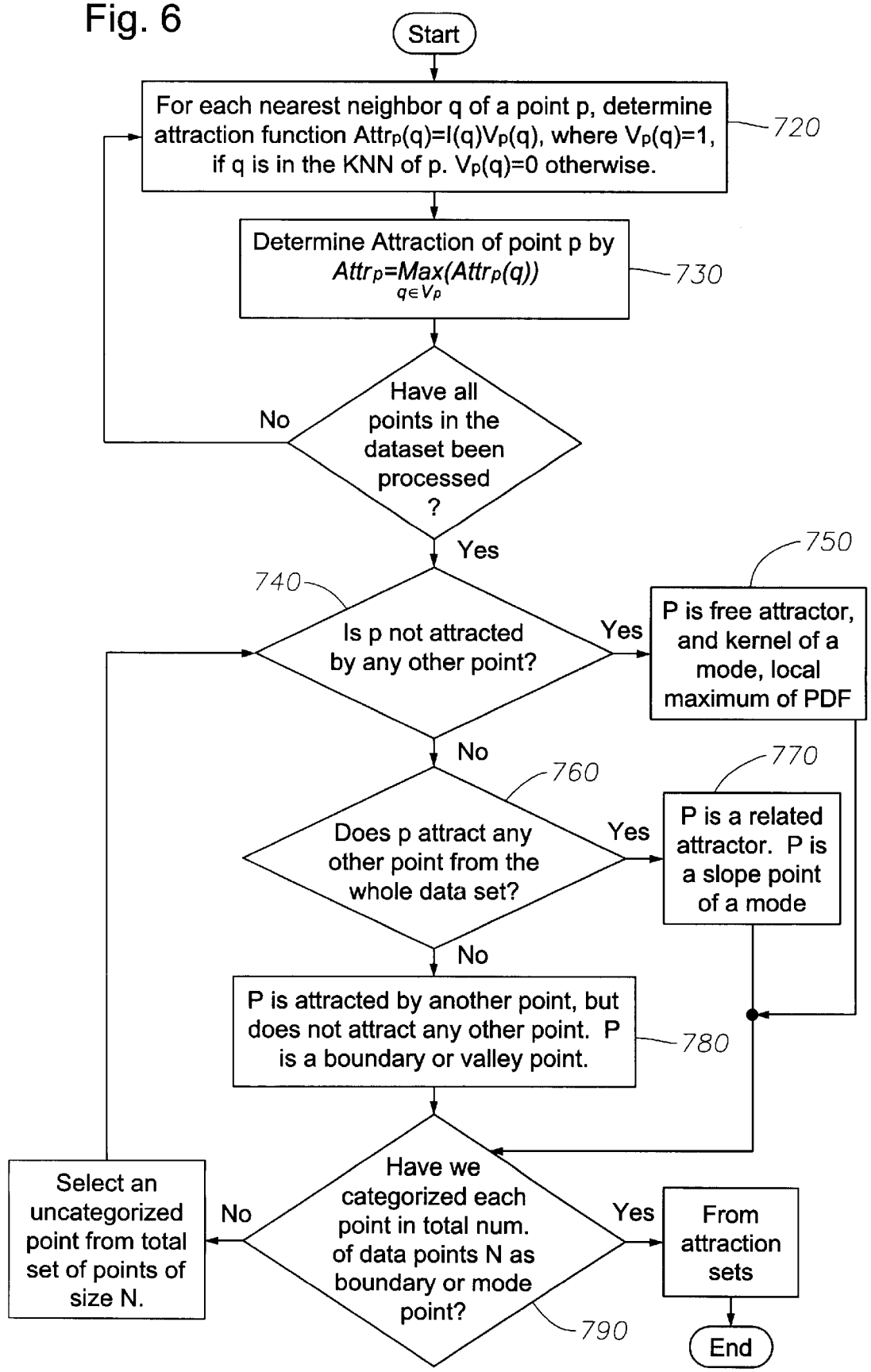
FIG. 6 is a flow diagram showing the steps to determine K-Nearest-Neighbor Attraction.

In FIG. 6, step 720 determines Eqn17 for all the neighboring points y of a measurement point x. In step 730, an adherence point (if one exists) is determined for measurement point x by identifying the point y in the $K_2$ nearest neighbor points of point x that maximizes $Attr_x(y)$:

$$Attr_x = \underset{y \in V_x}{\text{Max}}(Attr_x(y)) \quad \text{(Eqn 19)}$$

and verifying that the maximal value is greater than zero. To reduce the number of computations, it may be desired to eliminate the constant neighboring index value I(x) from Eqn17 and modify Eqn19 to be:

$$Attr_x = \underset{y \in V_x}{\text{Max}}(Attr_x(y)) - I(x) \quad \text{(Eqn 20)}$$

In steps 740 and 760, each point x is classified into one of the following categories:
1. x is not directed to any other point ($Attr_x \leq 0$). In this case (block 750) x is "free attractor", meaning that x is the kernel point of a local maximum of the PDF.
2. x is directed to another point and at the same time one or more other points are directed to x. In this case, (block 770) x is a "related attractor", meaning that x is on the slope surrounding the kernel point of a local maximum of the PDF.
3. x is directed to another point but no other points are directed to x. In this case, (block 780) x is "pending and related", meaning that x is a boundary point in a local minimum of the PDF.

Once all the points have been classified as determined in step 790, the points are formed into attraction sets. All free and related attractors are considered as modes, while the pending and related points are considered as valleys (boundaries). An attraction set is defined to be all points that directly or indirectly adhere to a common mode. Attraction sets may be considered as basic (elementary) clusters that are small natural data groups of the analyzed data set. Attraction sets include points "in the valley" which do not attract any other points. These are considered the boundary points of the set.

In the KNN attraction method, the parameter $K_2$ is used in the adherence function. The variable $K_2$ can be considered a smoothing parameter. The higher its value, the less basic the attraction set structure are. But $K_2$ should not be too high, as it will reduce local point-to-point attraction and merge some structures separated by narrow and deep valleys. In this step, a small $K_2$ is usually preferred to construct high-resolution structures. However, a very small $K_2$ should also be avoided because it will create small, disconnected islands, that is, attraction sets where points are attracted among themselves without creating any boundary points (block 780). If no boundary points are recognized in an attraction set, this attraction set would never be merged with other sets in the final merging step (block 530). By experience, $K_2=5$ generates consistent results even for high dimensional data sets. The preferred values for $K_2$ are not be less than 4 or much higher than 12, even for very large sets of data.

As a comparison, in the post-processing of Gan's clustering method, the clusters are recognized by use of a threshold on the boundary index function, where points with a boundary index lower than the threshold are considered as mode points; otherwise they are considered as boundary points. After removing the boundary points, Gan detects the connected components formed by mode points as clusters, and then the boundary points are assigned to the cluster of their nearest neighbor. Compared with Gan's method, experience shows that the MRGC method using KNN point-to-point attraction results in more consistent and stable clusters relative to variations in the smoothing parameters. In other words, unlike the method of Gan, the MRGC method generates better cluster borders and the results are less sensitive to the choice of smoothing parameter.

Referring momentarily to FIG. 4, as the K-Nearest-Neighbor attraction for each point is being determined and natural small groups are formed in block 515, a kernel representative index (KRI) for each point in the data set may be determined in block 520. The KRI permits determination of the optimal number of clusters for the analyzed data set.

For well-separated cluster data sets that contain a significant probability density difference between modes and valleys, the number of clusters can be easily identified. But in actual application data sets, the clusters are often very close together and the number of clusters is ambiguous. The optimal number of clusters becomes a function of desired resolution and it depends on the user's requirements, namely, at what resolution they would like to analyze the data. The MRGC automatic clustering method permits the user to select the optimal number of clusters from one or more different possibilities. Each cluster number is associated with a quality index and is suggested in the order of its probability.

To detect the best number of clusters, the MRGC algorithm first determines the representativity of each point in the data set. The representativity value aids in determining if a mode is a real mode of a cluster or just a local irregularity. Each point is characterized by how closely it represents a cluster kernel, and the best kernel representatives are then selected to form clusters by merging basic structures detected in block 515 (the merging process is presented further below). While ordering and analyzing the function of kernel representativity, we can recognize some cluster kernels are much better represented than others, and the gradient change of the Kernel Representative Indexes (KRI) can highlight these kernels.

The neighboring index function by itself is inadequate as an indicator for the number of clusters present because it is a primarily a local indicator with little influence from the points outside the local region. To remedy this local effect, the MRGC algorithm adds two other factors, the number of neighbors and the distance at which the neighboring index of a point "loses its power". This is the distance at which another point having a higher value can be found.

Figure 7:
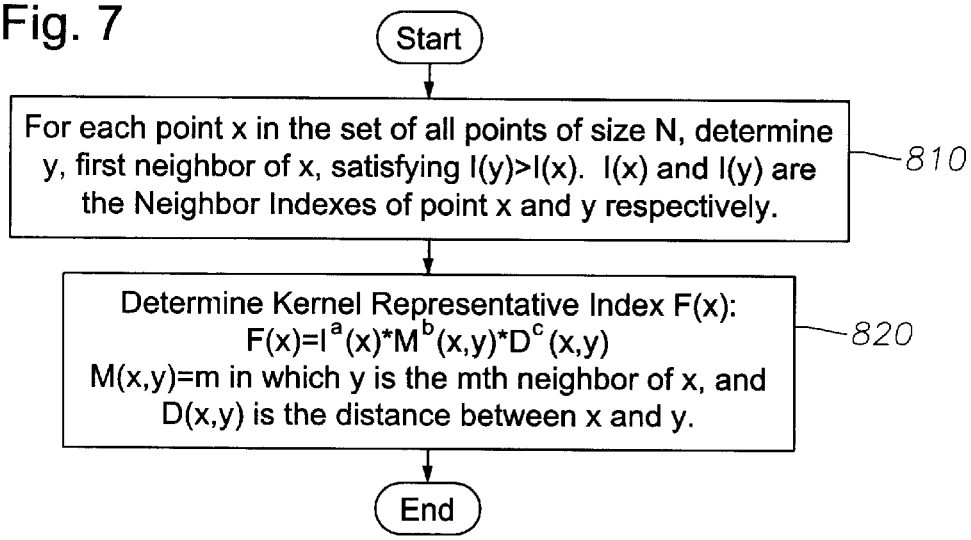
FIG. 7 is a flow diagram showing the steps for determining the Kernel Representative Index.

Let I(x) be the neighboring index value of point x, and y be the first neighbor of x having and index value I(y)>I(x) as shown in block 810 of FIG. 7. As calculated in block 820, the Kernel Representative Function F(x) can be written as:

$$F(x)=I^a(x)*M^b(x, y)*D^c(x, y) \qquad (Eqn21)$$

where a, b, and c are the exponents used to weight each corresponding function I(x), M(x,y), and D(x,y). The neighbor function M(x, y)=m, if y is the $m^{th}$ neighbor of x, and D(x,y) is the distance between x and y. Based on testing experience, a=b=c=1 give good results for the tested data. In this function, the factor I(x) allows us to recognize the peak (kernel) of a mode, and M(x,y) and D(x,y), the extension of the importance of this mode on the whole data set.

The number of neighbors, M(x,y), tends to produce resulting clusters of equivalent sizes and the distance, D(x,y), clusters of equivalent volumes. The combination of these two factors produces a good balance between the size and the volume of a cluster, and generates consistent results (the change of weights, b and c, will change this balance). The third drawback of Gan's method mentioned above, that it cannot generate consistent clusters if the data sets present clusters of very unbalanced sizes, is thus solved.

Figure 8:
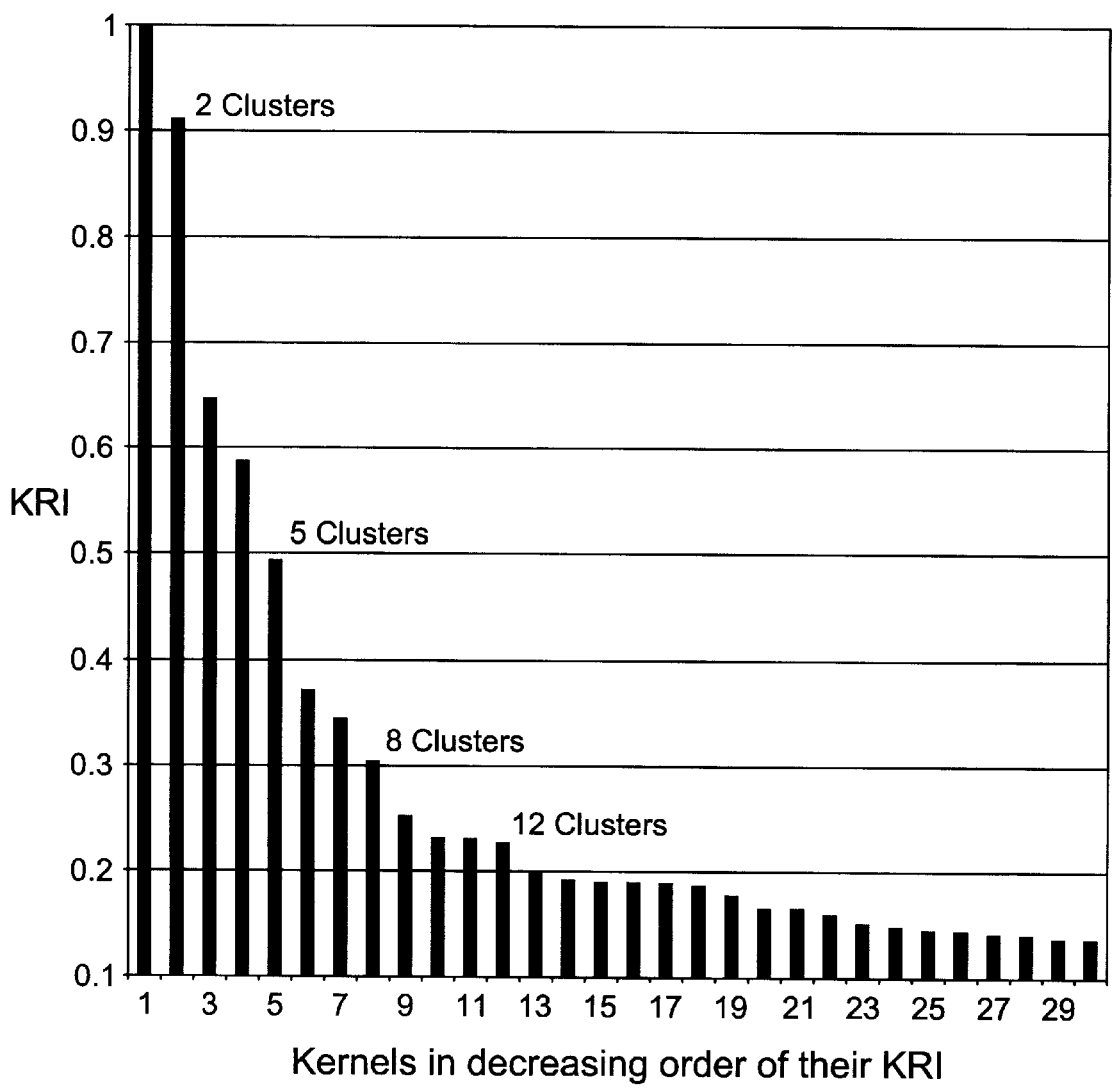
FIG. 8 is a curve of the Kernel Representative Index in decreasing order which may be used to determine the optimal number of clusters at different resolutions.

Once the KRI have been calculated, they may be sorted and displayed as shown in FIG. 8. With the help of the decreasingly ordered KRI curve, one can easily recognize the importance of a mode in the overall data set. There are several important drops (breaks) which corresponds to the changes of cluster kernels from one stable plateau to another. The drop points at 2, 5, 8 and 12 clusters each corresponds to the optimal number of clusters at different resolutions.

The drop points of the curve can be automatically detected by the peaks of the gradient (the first derivative) of the decreasingly ordered KRI curve. These peaks as well as their values are provided to the user as possibilities of optimal cluster numbers and associated quality indexes at different resolutions.

The points with the highest values of KRI selected in this way are considered as "cluster kernels" and are used for mode merging and forning the final clusters as shown in block 530 of FIG. 4.

Figure 9A:
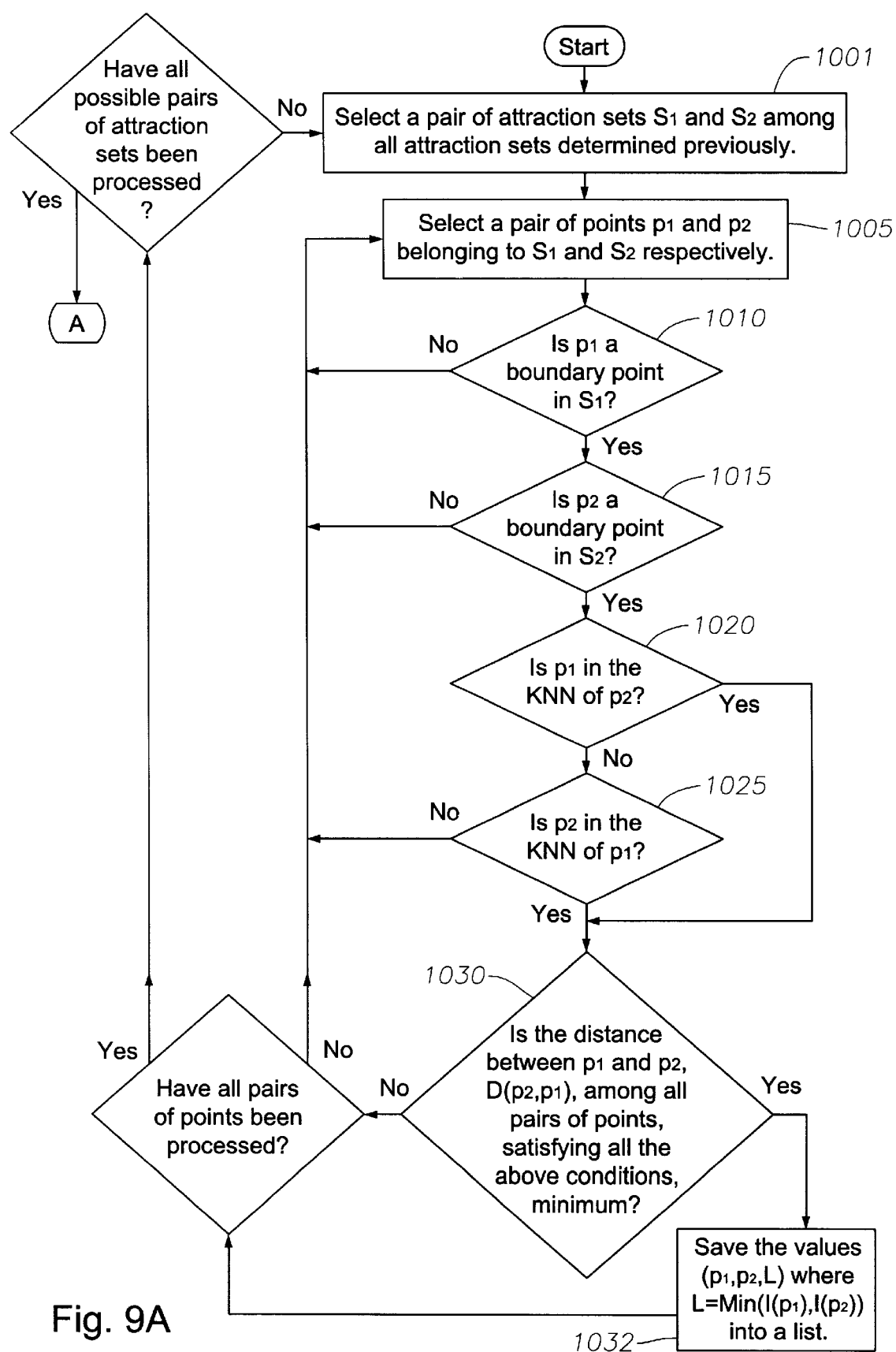
FIGS. 9A and 9B show the steps for performing merging to form final clusters.
Figure 9B:
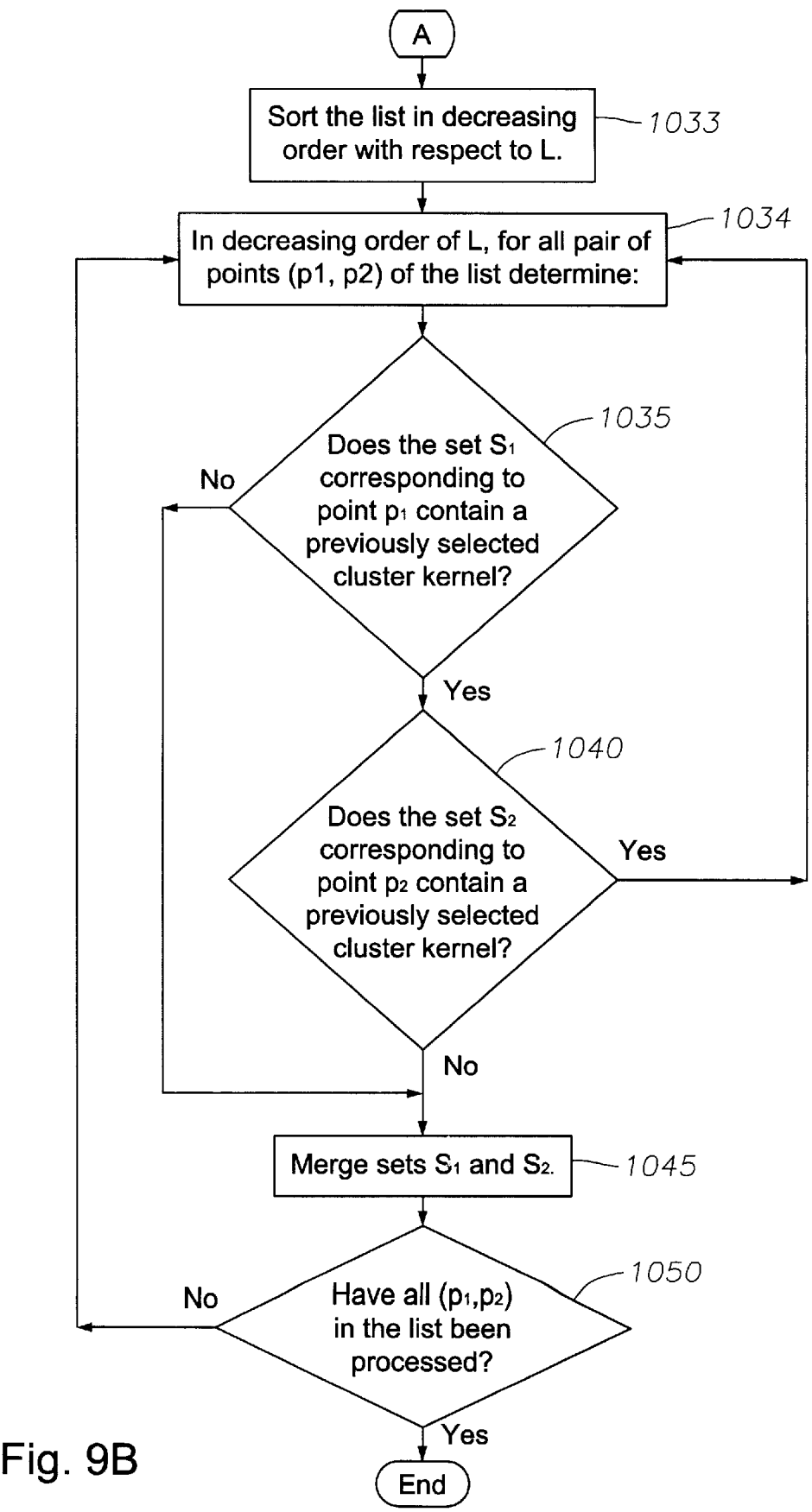

Before presenting multidimensional merging, a 2-D gray-level image example serves as a simple visualization aid. If we consider the image's gray-level as the third dimension, an image can be considered as a relief having mountains (light values) and seas (dark values). The merging method is conceptually similar to flooding the seas little by little, with one sea merging with another in the order of their lowest border levels. To merge mountains rather than seas, inverse landscapes should be considered, with the merging occurring in order of the highest border levels. This process allows us to remove the shallowest valley and merge the two most probable neighboring modes into one. But the realization of such a process for multidimensional data is not simple, because the neighbor relationship among modes is not easy to evaluate. With the help of the K-Nearest-Neighbor concept, the attraction sets and boundary points recognized previously in block 515, the MRGC method implements the following algorithm for multidimensional dot pattern mode merging as shown in FIGS. 9A and 9B. Attraction sets referred to below are the sets of points corresponding to the elementary groups found in block 515.

Step 1: For every pair of attraction sets $S_1$ and $S_2$ (block 1001), find a pair of points, $P_1$ and $p_2$ that fit the following four conditions:
1. $p_1 \in S_1$ and $P_2 \in S_2$, block 1005.
2. $p_1$ and $P_2$ are boundary points in $S_1$ and $S_2$, block 1010, 1015.
3. $p_1$ is in the K-nearest-neighbors of $P_2$, block 1020, or $P_2$ is in the KNN of $p_1$, block 1025. This K could take the value of $2 \times K_2$ for example, but should not be too high to avoid merging non-neighbor attraction sets.
4. The distance between $P_2$ and $p_1$, $D(P_2, p_1)$, block 1030, should be the minimum among all pairs of points satisfying the three previous conditions.

The points, $p_1$ and $P_2$, may not exist for all pairs of attraction sets. These points are considered as the shortest passage from one mode to another ($S_1$ and $S_2$). At the end of step 1, we have a list of all the shortest passages that exist between pairs of attraction sets.

Step 2: For each passage in the list of shortest passages, determine a level L, and sort the list of shortest passages in decreasing order (block 1033). For a given passage ($P_2$, $P_1$), the level is defined by the minimum neighboring index value:

$$L=\text{Min}\,(I(P_1), I(p_2)) \tag{Eqn22}$$

Step 3: For each passage in the sorted list, blocks 1035 and 1040 test whether $S_1$ and $S_2$ contain a cluster kernel selected in block 520. If at least one of them does not, merge the two modes (block 1045). This is repeated in order of decreasing passage levels (block 1034) until all passages have been considered (block 1050). In other words, the modes having the shallowest joint valley are merged first.

The clusters made in this way are deterministic. Clusters of higher resolutions using higher numbers of cluster kernels are always subclusters of the low-resolution clusters. This corresponds to the hierarchical way that the geologist organizes the geological facies. The MRGC technique will automatically find the most easily broken clusters and provide a solution according to the available data structure. This property is important for subdividing facies based on the already recognized electrofacies configuration.

Various extensions and different application modalities exist for the MRGC automatic clustering technique described above. The Neighboring Index generated from the MRGC method may be very helpful for geological interpretation of log measurement data. For example, thresholding the entire data set based on the NI will identify the denser zones of the log data set. Based on various experimental trials, it is known that these zones correspond to the thick beds less affected by shoulder effects, which have good homogeneity and greater lateral extension. Hence, these zones are the most important for fluid flow and, thus, greater attention must be paid to these thick beds. They will be useful for calibrating the electrofacies and designing/optimizing the sampling program of the core.

Another extension of the MRGC algorithm also involves the geological interpretation and calibration of the electrofacies. After the NI is normalized within each cluster in the same manner as the data normalization described above, then the threshold on the normalized NI allows the MRGC algorithm to recognize the mode zone of each cluster. The visualization of these mode zones facilitates the geological interpretation and calibration of the electrofacies, by allowing the geologist to concentrate on the most representative points of the facies.

After the electrofacies model is made, it is possible to interpret another well in terms of the existing electrofacies model. In the preferred embodiment, the Nearest Neighbor Propagation algorithm assigns to each new measurement point the electrofacies of its nearest neighbor in the reference data set used to create the model. Unlike the dynamic clustering or Self-Organizing-Map methods which generate a mosaic separation of the log space around the cluster kernels without any consideration of the cluster shapes, the nearest neighbor propagation algorithm retains the original cluster shapes.

Because the new measurement data might not fit the model data, quality control while gathering log data measurements is very important for correct model propagation. Three quality indices may be determined for each new measurement point (also termed application point). The quality indices are based on the concept of MRGC in order to evaluate the result of model propagation. First, for each application point x, its nearest neighbor y belonging to the cluster c in the reference model data set is determined. The propagation algorithm then calculates the following information for each x:

1. The NI of y and the cluster-normalized NI of y to help locate the point x with respect to the cluster kernel. Large values close to one indicate high confidence identification, whereas small values close to zero indicate more of an extrapolation in making the identification.

2. A Membership Index (MI) to indicate if x is inside or outside of the cluster defined on the reference data set. The MI can be calculated by:

$$MI=D(x, k)/D(y, k), \tag{Eqn23}$$

where k is the kernel point of the cluster c, and D is the distance function. MI is close to 1 when x is inside and close to the cluster c. The higher the MI the farther x is outside of the cluster c. The MI can be used for detecting abnormal points and/or new facies of the application data set.

3. An Ambiguity Index (AI) indicates if x is relatively ambiguous between two clusters. It can be calculated by:

$$AI=D(x, y)/D(x, z) \tag{Eqn24}$$

Where z is the nearest neighbor of x in the reference data set after removing the cluster c.

The values of AI should be between 0 and 1. The higher the AI, the more ambiguous x's position is between two clusters.

Using any or all of the above quality indices will enable automatic feedback to assess the applicability of the model to the new well for each point.

In discussing the quality indices, it was assumed that the data logs gathered at the new well site were the same types as those used to create the model. This assumption may be incorrect. There are many occasions where fewer or different logs are gathered, e.g. due to failure of one or more instruments downhole. Consequently, the electrofacies model may need to be propagated to other wells using a reduced application data set.

For an electrofacies model made by N logs (and thus of N data dimensions) and an application data set with N-R logs available, where R is the number of logs which are not available in the application data set, the nearest neighbor propagation method preferably assigns for each application data point the electrofacies of its nearest neighbor in the reference data set while ignoring the R unavailable logs of the reference data set. This method respects the original cluster shapes and can be applied to the results of any clustering method. For the case of MRGC, the quality indexes MI (Membership Index) and AI (Ambiguity Index) described above can also be calculated.

Testing the process described above on a four-dimensional data set, the following error percentages relative to a complete data set were obtained when one dimension was omitted.

| Removed Log | RhoB | Nphi | GR | DT |
|---|---|---|---|---|
| Error % | 26.5 | 18.5 | 34.8 | 16.1 |

This example illustrates that Nearest Neighbor Propagation allows propagation to reduced data sets. Furthermore, for complete data sets containing all logs it can be used to recognize the separability of each log for electrofacies by removing one log at a time. For the above example, the order of importance of these four logs is GR then RhoB, Nphi and DT. The larger the errors made after removing a particular log, the greater the amount of information provided by the log.

Propagation of electrofacies model for complete or reduced data sets can also occur using a Most Attracting Nearest Neighbor (MANN) method, that is, the neighbor having the highest value of NI in the K nearest neighbors of the reference data set. Nearest Neighbor propagation is a special case of MANN propagation with K=1. This method attracts application points to higher probability density zones (the higher the NI, the more dense the zone). In theory, for the reduced data set the propagation error should be reduced in zones of overlaid clusters.

Numerous variations and modifications will become apparent to those skilled in the art once the above disclosure is fully appreciated. For example, clustering techniques may be applied in fields such as economic analysis, image analysis, quality control for manufacturing and statistical analyses of other kinds. It is intended that the following claims be interpreted to embrace all such variations and modifications.

What is claimed is:

1. A method of defining the electrofacies of a geological formation traversed by a bore hole comprising:
   moving a sonde through a plurality of positions in said bore hole and recording a data set having a number d of measurements taken by the sonde at each of the plurality of positions, wherein the d measurements at each position are associable with a point in d-dimensional space; and
   calculating a neighboring index I of each measurement point.

2. The method of claim 1, wherein said calculating a neighboring index includes:
   determining for each given point x said given point's nearest neighbor ranks m relative to all other measurement points in the data set;
   calculating the weighted ranks, $\omega_n(x)$, of said given point using the nearest neighbor ranks m; and
   determining for each given point x the summation s(x) of all the weighted ranks $\omega_n(x)$ for said given point.

3. The method of claim 2, wherein said calculating a neighboring index further includes:
   determining from the summations s(x) for each measurement point x a minimum summation value $S_{min}$;
   determining from the summations s(x) for each measurement point x a maximum summation value $S_{max}$; and
   calculating for each point x the neighboring index I(x) corresponding to $$I(x) = \frac{s(x) - s_{\min}}{s_{\max} - s_{\min}}.$$

4. The method of claim 2 wherein the weighted rank of the point is $\omega_n(x) = \exp(-m/\alpha)$.

5. The method of claim 1, further comprising:
   determining attraction sets that are disjoint sets of measurement points.

6. The method of claim 5, wherein the attraction sets are determined by:
   calculating for each measurement point x in the data set a set of attraction values $Attr_x(y)$ where y ranges over the set of the nearest neighbors of x;
   calculating the maximum $Attr_x(y)$ for each point x;
   for those points x having a maximum $Attr_x(y)$ greater than zero, determining a directed connection from point x to the point y that maximizes $Attr_x(y)$;
   using the directed connections to categorize each measurement point x in the set as a kernel point of a mode, slope point of a mode, or boundary point of a mode; and
   forming attraction sets from the points having a shared kernel point.

7. The method of claim 6, wherein the attraction value calculations include finding the products $I(y) V_x(y)$ where $V_x(y)$ is an adherence function.

8. The method of claim 7 wherein the adherence function $V_x(y)=1$ if y is one of the K-nearest-neighbors of x, otherwise $V_x(y)=0$.

9. The method of claim 5, further comprising:
   determining one or more optimal cluster numbers by calculating a Kernel Representative Index F(x) for each measurement point in the data set.

10. The method of claim 9 wherein the Kernel Representative Index F(x) is determined by determining for each point x in the data set, the nearest neighbor y of x satisfying I(y)>I(x); and
    calculating $F(x)=I^a(x)*M^b(x,y)*D^c(x,y)$ in which M(x,y) is a rank function that equals m when y is the mth neighbor of x, D(x,y) is the distance between x and y, and a, b, c are predetermined constants.

11. The method of claim 9 wherein the optimal cluster number corresponds to a sharp drop in the Kernel Representative Index F(x).

12. The method of claim 9, further comprising:
    performing mode merging of the attraction sets to form clusters of measurement points, each cluster defining an electrofacies.

13. The method of claim 12, wherein the clusters of measurement points are formed by:
    for each a pair of attraction sets $S_1$ and $S_2$ from all attraction sets, identifying a pair of points $p_1$ and $P_2$ belonging to $S_1$ and $S_2$, respectively, that satisfy the conditions:
    (a) $p_1$ and $P_2$ are boundary points;
    (b) $p_1$ is in K-nearest-neighbors of $P_2$ or $P_2$ is in K-nearest-neighbors of $p_1$; and
    (c) the distance $D(p_2,p_1)$ between $p_1$ and $P_2$ is minimum among all pairs of points satisfying conditions (a) and (b).

14. The method of claim 13, further comprising:
    calculating $L=Min(I(p_1), I(p_2))$ for each pair of points satisfying conditions (a), (b) and (c); and
    storing the values $(p_1, p_2)$ wherein into a list in decreasing order with respect to L.

15. The method of claim 14, further comprising:
    traversing the list in decreasing order while merging sets corresponding to points $p_1$ and $P_2$ if the sets do not both contain previously selected cluster kernels.

16. The method of claim 12, further comprising:
    correlating the electrofacies with the geological formations traversed by the bore hole.

17. The method of claim 16, further comprising:
    prior to said calculating the neighboring index, selecting the recorded measurements points that are stable over consecutive levels; and
    after said correlating, comparing a recorded measurement point not selected in said selecting step to the clusters of selected measurement points to predict the facies of the geological formation at the bore hole positions corresponding to the unselected recorded measurement points.

18. The method of claim 17, further comprising:
    producing a graph of the electrofacies of the geological formation as a function of the depth of the bore hole.

19. An apparatus for performing automatic clustering, comprising:

a memory unit configured to store log measurement points in d-dimensional space; and a processing unit configured to retrieve the log measurement points from the memory unit, and configured to calculates a neighboring index I of each log measurement point.

20. The apparatus of claim 19, wherein the neighboring index corresponding to each log measurement point is calculated by:

determining for each given point x said given point's nearest neighbor ranks m relative to said given point's N-nearest-neighbors;

calculating the weighted ranks, $o_n(x)$, of said given point using the nearest neighbor ranks m; and determining for said given point the summation s(x) of the weighted ranks of said given point.

21. The apparatus of method of claim 20, wherein the neighboring index corresponding to each log measurement point is calculated by:

determining for each given point x said given point's nearest neighbor ranks m relative to said given point's N-nearest-neighbors;

calculating the weighted ranks, $o_n(x)$, of said given point using the nearest neighbor ranks m; and determining for said given point the summation s(x) of the weighted ranks of said given point;

determining the minimum value $S_{max}$ of s(x) over each log measurement point in the set;

determining the maximum value $S_{max}$ of s(x) over each log measurement point in the set; and calculating the neighboring index I(x) for each point in the set so that $$I(x) = \frac{s(x) - s_{\min}}{s_{\max} - s_{\min}}.$$

22. The apparatus of claim 19 wherein said processing unit is further configured to determine attraction sets, the attraction sets containing log measurement points.

23. The apparatus of claim 22, wherein the attraction sets are determined by:

calculating for each log measurement point p in the data set a set of attraction values $Attr_x(y)$ where y ranges over the set of the nearest neighbors of x;

calculating the maximum $Attr_x(y)$ for each point x;

for those points x having a maximum $Attr_x(y)$ greater than zero, determining a directed connection from point x to the point y that maximizes $Attr_x(y)$;

using the directed connections to identify those which log measurement points serve as a kernel points; and for each kernel point, forming an attraction set that includes the given kernel point and all those points having directed connections that lead to the given kernel point.

24. The apparatus of claim 19, wherein said processing unit is further configured to determine an optimal cluster number by calculating a Kernel Representative Index F(x) for each log measurement point.

25. The apparatus of claim 24, wherein the Kernel Representative Index F(x) is determined by:

calculating for each point x in the data set the nearest neighbor y of x satisfying I(y)>I(x); and calculating $F(x)=I^a(x)*M^b(x, y)*D^c(x, y)$ in which M(x, y) is a rank function that equals m when y is the mth neighbor of x, D(x,y) is the distance between x and y, and a, b, c are predetermined constants.

26. The apparatus of claim 19 wherein the optimal cluster number corresponds to a sharp drop in the Kernel Representative Index F(x).

27. The apparatus of claim 19, wherein said processing unit is further configured to perform mode merging of the attraction sets to form clusters of log measurement points, each cluster characterizing an electrofacies.

28. The apparatus of claim 27, wherein the clusters of log measurement points are formed by:

for each a pair of attraction sets $S_1$ and $S_2$ from all attraction sets, identifying a pair of points $p_1$ and $P_2$ belonging to $S_1$ and $S_2$, respectively, that satisfy the conditions:

(a) $p_1$ and $P_2$ are boundary points;

(b) $p_1$ is in K-nearest-neighbors of $P_2$ or $P_2$ is in K-nearest-neighbors of $p_1$; and (c) the distance $D(p_2,p_1)$ between $p_1$ and $P_2$ is minimum among all pairs of points satisfying conditions (a) and (b).

29. The apparatus of claim 28, wherein the clusters of log measurement points are further formed by:

calculating $L=Min(I(p_1), I(p_2))$ for each pair of points satisfying conditions (a), (b) and (c); and storing the values $(p_1,p_2)$ wherein into a list in decreasing order with respect to L.

30. The apparatus of claim 29, wherein the clusters of log measurement points are further formed by:

traversing the list in decreasing order while merging sets corresponding to points $p_1$ and $P_2$ if the sets do not both contain a previously selected kernel points.

31. The apparatus of claim 27, wherein the processing unit is further configured to correlate the electrofacies with the facies traversed by the bore hole.

32. A method of defining the electrofacies of a geological formation traversed by a bore hole comprising:

moving a sonde through a plurality of positions in said bore hole and recording a data set having a number d of log measurements taken by the sonde at each of the predetermined levels, wherein the d log measurements at each position are associable with a point in d-dimensional space;

calculating a neighboring index I of each log measurement points; and determining an optimal cluster number by calculating a Kernel Representative Index F(x) for each log measurement point.

33. The method of claim 32, wherein the Kernel Representative Index F(x) is determined by:

determining for each point x in the data set, the nearest neighbor y of x that satisfies I(y)>I(x); and calculating $F(x)=I^a(x)*M^b(x, y)*D^c(x, y)$ in which M(x, y) is a rank function that equals m when y is the mth neighbor of x, D(x,y) is the distance between x and y, and a, b, c are predetermined constants.

34. The method of claim 32 wherein the optimal cluster number corresponds to a sharp drop in Kernel Representative Index F(x).

35. An apparatus for performing automatic clustering, comprising:

a memory unit configured to store measurement points in d dimensional space;

a processing unit configured to retrieve the measurement points from the memory unit; and wherein said processing unit calculates a neighboring index I of each measurement point.

36. The apparatus of claim 35, wherein the neighboring index corresponding to each measurement point is calculated by:

determining for each given point x said given point's nearest neighbor ranks m relative to all other points;

calculating the weighted ranks, $o_n(x)$, of said given point using the nearest neighbor ranks m; and determining for said given point the summation s(x) of the weighted ranks for said given point.

37. The apparatus of method of claim 36, wherein the neighboring index corresponding to each measurement point is further calculated by:

determining the minimum value $S_{min}$ of s(x) over each measurement point in the set;

determining the maximum value $S_{max}$ of s(x) over each measurement point in the set; and calculating the neighboring index I(x) for each point in the set by $$I(x) = \frac{s(x) - s_{\min}}{s_{\max} - s_{\min}}.$$

38. The apparatus of claim 35, wherein said processing unit is further configured to determine attraction sets that are disjoint sets of measurement points.

39. The apparatus of claim 38, wherein the attraction sets are determined by:

calculating for each measurement point x in the data set a set of attraction values $Attr_x(y)$ where y ranges over the set of the nearest neighbors of x;

calculating the maximum $Attr_x(y)$ for each point x;

for those points x having a maximum $Attr_x(y)$ greater than zero, directing point x to the point y that maximizes $Attr_x(y)$;

using the directions to identify points that serve as a kernel point of a mode; and for each kernel point, forming an attraction set that includes the given kernel point and all those points directed to the kernel point.

40. The apparatus of claim 38, wherein the processing unit is further configured to determine one or more optimal cluster numbers by calculating a Kernel Representative Index F(x) for each measurement point in the data set.

41. The apparatus of claim 40, wherein the Kernel Representative Index F(x) is determined by:

calculating for each point x in the data set, the nearest neighbor y of x satisfying I(y)>I(x); and calculating $F(x)=I^a(x)*M^b(x,y)*D^c(x,y)$ in which M(x,y) is a rank function that equals m when y is the mth neighbor of x, D(x,y) is the distance between x and y, and a, b, c are predetermined constants.

42. The apparatus of claim 40 wherein the optimal cluster numbers correspond to sharp drops in the Kernel Representative Index F(x).

43. The apparatus of claim 40, wherein the processing unit is further configured to perform mode merging of the attraction sets to form clusters of measurement points, each cluster characterizing a prototype.

44. The apparatus of claim 43, wherein the clusters of measurement points are formed by:

for each a pair of attraction sets $S_1$ and $S_2$ from all attraction sets, identifying a pair of points $p_1$ and $P_2$ belonging to $S_1$ and $S_2$, respectively, that satisfy the conditions:

(a) $p_1$ and $P_2$ are boundary points;

(b) $p_1$ is in K-nearest-neighbors of $P_2$ or $P_2$ is in K-nearest-neighbors of $p_1$; and (c) the distance $D(p_2,p_1)$ between $p_1$ and $P_2$ is minimum among all pairs of points satisfying conditions (a) and (b).

45. The apparatus of claim 44, further comprising:

calculating $L=Min(I(p_1), I(p_2))$ for each pair of points satisfying conditions (a), (b) and (c); and storing the values $(p_1,p_2)$ wherein into a list in decreasing order with respect to L.

46. The apparatus of claim 45, further comprising:

traversing the list in decreasing order while merging sets corresponding to points $p_1$ and $P_2$ if the sets do not both contain a previously selected kernel points.

47. The apparatus of claim 43, wherein the processing unit is further configured to correlate the prototype with new measurement points.

\* \* \* \* \*